United States Patent [19]
Klotzbach et al.

[11] Patent Number: 5,796,742
[45] Date of Patent: *Aug. 18, 1998

[54] BI-DIREDCTIONAL WIRE-LINE TO LOCAL AREA NETWORK INTERFACE AND METHOD

[75] Inventors: David Klotzbach, Carpentersville; Mark Pecen, Naperville; Keith Favreau, Wheeling; Michael Knueven, Glen Ellyn, all of Ill.

[73] Assignee: U.S. Robotics Corporation, Skokie, Ill.

[*] Notice: The term of this patent shall not extend beyond the expiration date of Pat. No. 5,410,754.

[21] Appl. No.: 783,539

[22] Filed: Jan. 14, 1997

Related U.S. Application Data

[63] Continuation of Ser. No. 418,120, Apr. 6, 1995, abandoned, which is a continuation of Ser. No. 95,682, Jul. 22, 1993, Pat. No. 5,410,754.

[51] Int. Cl.$^6$ ........................................... H04L 12/46
[52] U.S. Cl. .................. 370/466; 370/469; 370/474; 379/93.01
[58] Field of Search ..................... 370/466, 469, 370/474, 476, 537, 542, 401, 402; 379/93.01, 93.09, 93.15; 395/200.79, 200.8

[56] References Cited

U.S. PATENT DOCUMENTS

| | | | |
|---|---|---|---|
| 4,470,140 | 9/1984 | Coffey | 370/400 |
| 4,578,789 | 3/1986 | Middleton et al. | 370/370 |
| 4,589,107 | 5/1986 | Middleton et al. | 370/265 |
| 4,590,467 | 5/1986 | Lare | 340/825.5 |
| 4,723,238 | 2/1988 | Isreal et al. | 370/352 |
| 4,752,924 | 6/1988 | Darnell et al. | 370/431 |
| 4,884,285 | 11/1989 | Heynen et al. | 375/242 |
| 4,991,169 | 2/1991 | Davis et al. | 370/463 |
| 5,012,467 | 4/1991 | Crane | 370/445 |
| 5,033,062 | 7/1991 | Marrow et al. | 375/220 |
| 5,058,133 | 10/1991 | Duncanson et al. | 375/260 |
| 5,088,032 | 2/1992 | Basack | 395/200.72 |
| 5,107,456 | 4/1992 | Schuur | 395/310 |
| 5,164,943 | 11/1992 | Waggoner | 371/3 |
| 5,165,021 | 11/1992 | Wu et al. | 395/200.64 |
| 5,184,348 | 2/1993 | Abdelmou Halib et al. | 370/431 |
| 5,229,994 | 7/1993 | Balzano et al. | 370/401 |
| 5,231,649 | 7/1993 | Duncanson | 375/260 |
| 5,239,542 | 8/1993 | Breidenstein et al. | 370/376 |
| 5,289,468 | 2/1994 | Yoshida | 370/401 |
| 5,293,488 | 3/1994 | Riley et al. | 395/200.74 |
| 5,317,215 | 5/1994 | Kranzler | 327/47 |
| 5,410,754 | 4/1995 | Klotzbach et al. | 370/466 |
| 5,436,617 | 7/1995 | Adams et al. | 340/825.04 |
| 5,448,566 | 9/1995 | Richter et al. | 370/431 |
| 5,463,623 | 10/1995 | Grimes et al. | 370/466 |
| 5,473,599 | 12/1995 | Li et al. | 370/219 |
| 5,497,373 | 3/1996 | Hulen et al. | 370/85.13 |
| 5,528,595 | 6/1996 | Walsh et al. | 370/402 |

*Primary Examiner*—Min Jung
*Attorney, Agent, or Firm*—McDonnell Boehnen Hulbert & Berghoff

[57] ABSTRACT

A bi-directional wire-line to local area network interface, used between a remote host on a local area network (LAN), and a wire-line carrier system. A LAN media access control and physical interface converts outgoing LAN data from a LAN to an outgoing-data packet with a machine readable format. A LAN transmission control protocol and internet protocol stack identifies a protocol type of the outgoing-data packet from the LAN-MAC and physical interface. When the outgoing-data packet does not have a modem control command, a protocol converter correlates the outgoing-data packet to a channel number and depacketizes the outgoing-data packet into outgoing-binary data. Using the channel number, a connection controller and signal transform polls the outgoing-binary data and transforms the outgoing-binary data to a digitized representation of an analog signal having pulse code modulation (PCM). A wire-line carrier interface uses the channel number for multiplexing the digitized representation of the analog signal with frame bits, and also multiplexes any alarm conditions and signalling bits, as an outgoing-wire-line carrier signal. The wire-line carrier interface sends the outgoing-wire-line carrier signal over the wire-line carrier system.

18 Claims, 3 Drawing Sheets

BI-DIRECDTIONAL WIRE-LINE TO LOCAL AREA NETWORK INTERFACE AND METHOD

This application is a continuation of application Ser. No. 08/418,120, filed Apr. 6, 1995, now abandoned, which is a continuation of Ser. No. 08/095,682 filed Jul. 22, 1993, now U.S. Pat. No. 5,410,754.

BACKGROUND OF THE INVENTION

The present invention relates to the telecommunications and data communications, and more specifically to an interface between a telecommunications medium, such as T1, T3, wire-line carrier, and local area network using, for example an Ethernet protocol, as used for dial-up services, such as electronic bulletin board systems, and large development environments which utilize the services of remote host computers located many miles away from the development site. The user of such a service utilizes the public voice-grade telephone system along with the appropriate data modem to create a communications link with the remote computing facility. The remote host is connected to one or more landline modems either (1) directly or (2) via a local area network terminal server.

DESCRIPTION OF THE RELEVANT ART

Current high capacity telecommunications channels include T1, T2, T3, etc., wire-line carrier systems which time division multiplex (TDM) data into frames, with each frame having a plurality of TDM channels. Due to their high capacity, the wire-line carrier systems are utilized instead of individual dial-up telephone lines, reducing both the cost and number of connections from the subscriber to the central office. For example, a T1 service comprises 24 voice grade dial-up lines, each of which may be used for the transmission of data via the telephone system to a remote host.

At the same time, local area networks promote a mechanism for resource sharing among users, such as a plurality of computer workstations, file servers, facsimile servers, modem servers, printer servers, etc. Two or more local area networks may communicate over a wire-line carrier system. The protocol of data communicated from a local area network, over a wire-line carrier system, typically is transformed into a form suitable for sending over the wire-line carrier system.

An example of a common local area network protocol is Ethernet. As is well known in the art, Ethernet is a commonly used local area network (LAN) transmission standard, of type wire-line carrier sense with multiple access and collision detect (CSMA/CD), and has been defined by XEROX CORPORATION, THE ETHERNET: A LOCAL AREA NETWORK DATA LINK LAYER AND PHYSICAL LAYER SPECIFICATIONS (Xerox Corp. Intel Corp. Digital Equipment Corp. November 1982.)

In order to interface between the local area network and the wire-line carrier system, typically a dial-up connection is established between a host utilizing a T1 line connected to a telephone company central office and a remote host by connecting that host to a local area network (LAN) terminal server, which demultiplexes a group of LAN communication sessions to several communication lines, each of which are capable of driving a dial-up modem suitable for communications over a voice-grade telephone line. Each modem is then connected to a T1 port concentrator unit which remultiplexes the information for each dial-up session in PCM format suitable for transmission via the T1 line.

SUMMARY OF THE INVENTION

A general object of the invention is a bi-directional wire-line, such as T1, T2, T3, (wire-line carrier signals) to local area network interface, which does not convert wire-line signals or local area network signals to an analog form.

Another object of the invention is a bi-directional wire-line to local area network interface supporting modulation, demodulation, multiplexing, and de-multiplexing of wire-line carrier signals in the time domain, and signaling required for dial-up call origination and termination.

An additional object of the invention is a bi-directional wire-line to local area network interface supporting a known local area network protocol stack from media access control layer up to and including the session layer.

The present invention, as broadly embodied and described herein, includes a bi-directional wire-line to local area network interface, used between a remote host on a local area network (LAN), and a wire-line carrier system. By wire-line carrier system is meant any of T1, T2, T3 wire-line carrier systems, and other equivalent wire-line carrier systems. The interface includes a LAN media access control (LAN-MAC) and physical interface, a LAN transmission control protocol and internet protocol stack, a protocol converter, a connection controller and signal transform subsystem, and a wire-line carrier interface. The LAN-MAC and physical interface converts outgoing LAN data from a local area network to an outgoing-data packet with a machine readable format. The LAN transmission control protocol and internet protocol stack identifies a protocol type of the outgoing-data packet from the LAN-MAC and physical interface. By "outgoing-data packet" is meant a data packet traveling from the remote host to the wire-line carrier system. When the outgoing-data packet has mangled data or a mangled header, the LAN transmission control protocol and internet protocol stack requests the remote host to send another data packet. When the outgoing-data packet of internet protocol type does not have mangled data or mangled header, the LAN transmission control protocol and internet protocol stack correlates the outgoing-data packet to a communications session comprising a pair of unidirectional channels, one for outbound data and another for inbound data. By "incoming-data packet" is meant a data packet traveling from the wire-line carrier system to the remote host.

When the outgoing-data packet has a modem control command, the protocol converter decodes the modem control command. When the outgoing-data packet does not have a modem control command, the protocol converter correlates the outgoing-data packet to a channel number and depacketizes the outgoing-data packet into outgoing-binary data. By "outgoing-binary data" is meant binary data traveling from the remote host to the wire-line carrier system.

Using the channel number, the connection controller and signal transform subsystem polls the outgoing-binary data and transforms the outgoing-binary data to a digitized representation of an analog signal having pulse code modulation (PCM). A wire-line carrier interface uses the channel number for multiplexing the digitized representation of the analog signal with frame bits, and also multiplexes any alarm conditions and signalling bits, as an outgoing-wire-line carrier signal. The wire-line carrier interface sends the outgoing-wire-line carrier signal over the wire-line carrier system.

The present invention also includes using the bi-directional wire-line to local area network interface from the wire-line carrier system to the remote host on the local area network. In this embodiment, the wire-line carrier interface, using frame bits in a wire-line carrier signal from the wire-line carrier system, demultiplexes the wire-line carrier signal as alarm signals, signalling bits and channel PCM data. The wire-line carrier interface associates the demultiplexed PCM data with an appropriate channel. The signal transform transforms the channel PCM data to incoming-binary data. By "incoming-binary data" is meant data traveling from the wire-line carrier system to the remote host. Using the channel number associated with the incoming-binary data, the protocol converter correlates the incoming-binary data and channel number to a Telnet session number and packetizes the incoming-binary data as an incoming-data packet. By "incoming-data packet" is meant a data packet traveling from the wire-line carrier system to the remote host. When the incoming-binary data are invalid, the protocol converter sends a message to the wire-line carrier interface requesting retransmission of the channel PCM data associated with the invalid incoming-binary data.

The LAN transmission control protocol and internet protocol stack transfers the incoming-data packet over the internet protocol (IP) layer as an IP packet using address resolution protocol (ARP) to insert a physical address field of the remote host. The LAN-MAC and physical interface converts the incoming-data packet to LAN data and sends the LAN data to the remote host. LAN data are data sent on the local area network.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
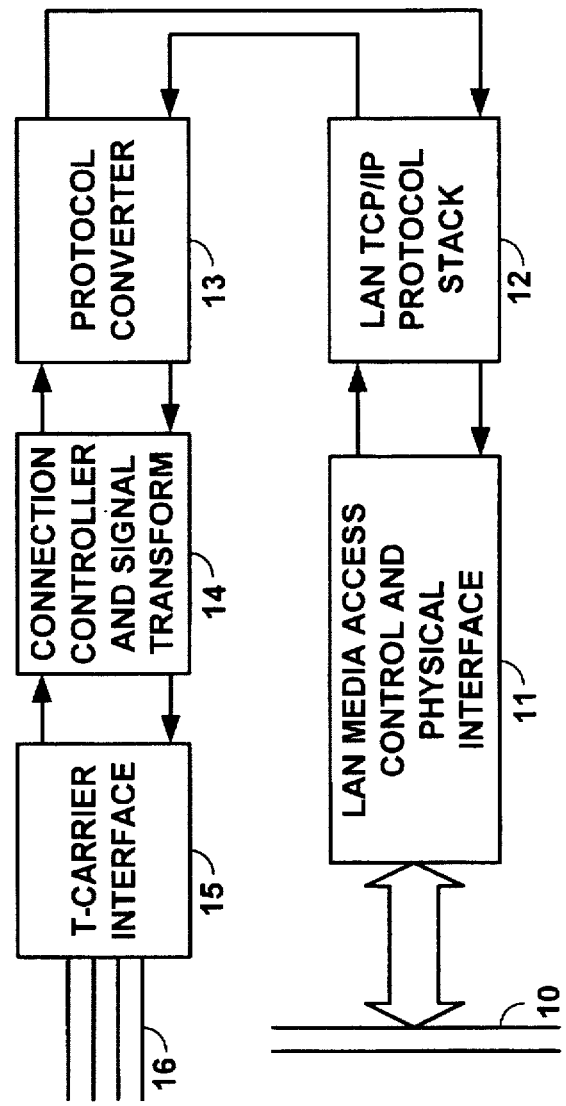
FIG. 1 is a block diagram of the wire-line carrier to local area network interface.

Reference now is made in detail to the present preferred embodiments of the invention, examples of which are illustrated in the accompanying drawings, wherein like reference numerals indicate like elements throughout the several views.

A T1 line is a well-known type of multipath communication line having one to twenty-four voice frequency channels as derived from D1 or D2 channel banks capable of transmission rates up to 1.544 megabits per second. The standard T1 line provides time division multiplex of twenty-four separate telephone lines that are separately connected to a respective modem and terminal server at the remote location. Thus, while the normal installation would require a T1 channel bank, a modem and an appropriate terminal server, the present invention is able to connect a T1 line as an input to a single digital signal processor to generate an output that is suitable for a network interface controller or the like.

The present invention provides a bi-directional wire-line to local area network interface used from a remote host on a local area network (LAN), to a wire-line carrier system. The bi-directional wire-line to local area network interface includes converting means, identifying means, correlating means, polling means, and multiplexing/demultiplexing means. The converting means converts LAN data from the local area network to an outgoing-data packet with a machine readable format. The term "LAN data" as used herein refers to data normally found on a local area network. The identifying means identifies a protocol type of the outgoing-data packet from the converting means. When the outgoing-data packet has mangled data or a mangled header, the identifying means requests the remote host to send another outgoing-data packet. When the outgoing-data packet is of type internet protocol and does not have mangled data or a mangled header, the identifying means correlates the outgoing-data packet to an incoming-data packet.

When the outgoing-data packet has a modem-control command, the correlating means decodes the modem control command. When the outgoing-data packet does not have a modem-control command, the correlating means correlates the outgoing-data packet to a channel number and depacketizes the outgoing-data packet into outgoing-binary data. The polling means polls the outgoing-binary data and transforms the outgoing-binary data to a digitized representation of an analog signal having pulse code modulation (PCM). The multiplixing/demultiplexing means, using the channel number, multiplexes the digitized representation of the analog signal with frame bits, any alarm conditions and signalling bits as an outgoing-wire-line carrier signal. The multiplexing/demultiplexing means sends the outgoing-wire-line carrier signal over the wire-line carrier system.

The bi-directional wire-line to local area network interface can be used to interface data from the wire-line carrier system to the remote host on the local area network. In this embodiment, using frame bits in a wire-line carrier signal from the wire-line carrier system, the multiplexing/demultiplexing means demultiplexes the wire-line carrier signal as alarm signals, signalling bits and PCM data, and associates the demultiplexed PCM data with an appropriate channel. The transforming means transforms the PCM data to incoming-binary data.

Using the channel number associated with the incoming-binary data, and when the incoming-binary data are not invalid, the correlating means correlates the incoming-binary data and channel number to a Telnet session number and packetizes the incoming-binary data as at least one incoming-data packet. When the incoming-binary data are invalid, the correlating means sends a message to the wire-line carrier system requesting retransmission of the PCM data associated with the invalid incoming-binary data. The transferring means transfers the incoming-data packet over the internet protocol (IP) layer as an IP packet and address resolution protocol (ARP) inserts a physical address field of the remote host. The converting means converts the incoming-data packet to LAN data and sends the LAN data to the remote host.

In the exemplary arrangement shown in FIG. 1, the bi-directional wire-line to local area network interface is connected between a wire-line carrier system 16 and a local area network 10. As shown in FIG. 2B, a remote host 17 is connected to the local area network 10. The converting means, identifying means, correlating means, polling means, and multiplexing/demultiplexing means are embodied, by way of example, as a LAN media access control (LAN- MAC) and physical interface 11, a LAN transmission control protocol and internet protocol (TCP/IP) stack 12, a protocol converter 13, a connection controller and signal transform subsystem 14, and a wire-line carrier interface 15, respectively. The LAN TCP/IP stack 12 is coupled between the LAN-MAC and physical interface 11 and the protocol converter 13. The connection controller and signal transform 14 is coupled between the protocol converter 13 and the wire-line carrier interface 15.

The TCP/IP protocol stack 12 provides a remote host 17 operating on a local area network 10 with a known LAN communication protocol. The LAN communications protocol creates the illusion of multiple sessions over which dial-up communication takes place. This illusion of seeming session multiplicity is similar to that of the time-division multiplex concept used by the wire-line carrier system in which many logical communication channels propagate over a single transmission medium.

When the interface is used between a remote host 17, on a local area network 10, and a wire-line carrier system 16, the LAN-MAC and physical interface 11 convert data from the local area network 10 to an outgoing-data packet with a machine readable format. The LAN TCP/IP stack 12, reading the outgoing-data packet, identifies a protocol type of the outgoing-data packet from the LAN-MAC and physical interface 11.

When the outgoing-data packet has mangled data or a mangled header, the LAN TCP/IP stack 12 sends a request to the remote host 17 to send a replacement outgoing-data packet. When the outgoing-data packet has an internet protocol and does not have mangled data or a mangled header, the LAN TCP/IP stack 12 correlates the outgoing-data packet to an incoming-data packet.

Rather than the idea of having fixed time-slots, each representing a discrete point where multiplexed data represents information bound to specific logical channels, the Ethernet TCP/IP stack 12 achieves a similar multiplexing effect by utilizing a wire-line carrier sense multiple access with collision detect (CSMA/CD) technique in which the Ethernet link and MAC layers control the mass contention for a clear communication channel for out-bound information arriving from the upper layers of the TCP/IP stack. The upper layer of the LAN TCP/IP stack 12, e.g. TCP, creates and maintains the notion of discrete ports. A port represents a logical channel over which communication is exchanged. The layer above TCP which resides in user space in the LAN TCP/IP stack 12, the Telnet protocol, uses the notion of TCP "ports", binding the associativity of TCP "ports" to Telnet "sessions".

The Ethernet has become a de facto network standard over the years. Most UNIX TCP/IP implementations are built on the Ethernet link layer control (LLC) and MAC at the present time. Ethernet, and its IEEE 802.3 LLC counterpart, operates on the principle of CSMA/CD. Fundamentally, a CSMA/CD local area network node listens on the medium before transmitting. At such point in time when the physical medium is not in use, then the originating node begins to transmit. All other nodes on the network defer to the originating station's data traffic, thereby avoiding contention for the physical transmission medium.

Situations exist when two or more nodes on the local area network, having listened to the physical medium and determined that the physical medium is not in use by another station, begin transmitting simultaneously resulting in a collision. A CSMA/CD node detects collisions by monitoring the signal level on the physical cable, or by comparing transmitted data to received data, as the Ethernet encoder-decoder (ENDEC) is capable of decoding data while transmitting in most implementations. Upon the detection of a collision, the node sends a jamming signal onto the medium so that the collision is extended to the point where all stations on the same physical medium detect it. Then the contending stations both stop transmitting for an exponentially derived pseudo-random period, referred to as a "back-off" period. Now, one of the nodes begins to re-try the transmission after the initial back-off period. Should another collision occur, the process is repeated until a collision-free transmission results or the maximum number of re-tries is reached. The back-off period for each successive retry is chosen from a pseudo-random number having twice the mean value of those used for the previous attempt. This type of CSMA/CD is termed to be probabilistic.

The protocol converter 13 converts (1) packetized information arriving from the local area network 10 in the form of Telnet data to binary information along with connection control commands; and, (2) converts binary information arriving from the wire-line carrier system 16 along with connection status information to packetized LAN data.

When an outgoing-data packet has a modem control command, the protocol converter 13 decodes the modem control command. When the outgoing-data packet does not have a modem control command, the protocol converter 13 correlates the outgoing-data packet to a channel number and depacketizes the outgoing-data packet into outgoing-binary data.

The connection controller and signal transform subsystem 14 performs a transformation of the PCM signal received on the wire-line carrier system 16. The PCM signal is a digitized representation of an analog signal that is transformed directly into digital data in the time domain. Conversely, transformation of the digital data directly to its analog representation occur when transmitting information using the wire-line carrier system 16.

The connection controller and signal transform subsystem 14 supports modulation, error detection and correction, and data compression standards, and provides call origination and termination control. The incoming channel is analyzed for the presence of a call. Once the connection is established, the modem standard is determined and communications parameters are negotiated. As data exchange occurs, the signals are decoded and passed onto the local area network 10. Eventually the call is concluded and the channel is freed. When originating a call, a wire-line carrier channel is requested and secured. Connection is established and the call continues as when a call is received.

Using the channel number, the connection controller and signal transform subsystem 14 polls the outgoing-binary data, and transforms the outgoing-binary data to a digitized representation of an analog signal having PCM.

The wire-line carrier interface 15 is a full duplex digital transmission medium connected to two twisted metallic wire pairs supplied by a commercial telephone common wire-line carrier. The wire-line carrier line normally extends from a telephone company's central office to a users location and provides multiple channels for voice or data which are time division multiplexed for transmission over a pair of wires. The wire-line carrier system 16 utilizes two pairs of wires, one for transmission of data and the other for reception of data at either end of the connection.

The wire-line carrier interface 15 separates and combines the individual data parts that make up the bi-directional wire-line carrier signal, e.g., a DS1 signal, such as frame bits, signaling bits, e.g. on/off hook for each channel, alarm conditions, and channel data. Frame bits, alarm conditions and controlling channel status are processed within the context of the wire-line carrier interface 15. Individual channel data along with status information are delivered to and received from the connection controller and signal transform subsystem 14, where PCM data are digitally modulated and demodulated.

Using the channel number, wire-line carrier interface 15 multiplexes the digitized representation of the analog signal with frame bits, any alarm conditions and signalling bits as an outgoing-wire-line carrier signal. The wire-line carrier interface 15 sends the outgoing-wire-line carrier signal over the wire-line carrier system 16.

The bi-directional wire-line to local area network interface can be used from a wire-line carrier system 16 to a remote host 17 on a local area network 10. The wire-line carrier interface 15 uses frame bits in an incoming-wire-line carrier signal from the wire-line carrier system, demultiplexes the incoming-wire-line carrier signal as alarm signals, signalling bits and PCM data, and associates the demultiplexed PCM data with a corresponding channel. The signal transform 14 transforms the PCM data to incoming-binary data. The protocol converter 13, uses a channel number associated with the incoming-binary data and when the incoming-binary data is not invalid, correlates the binary-data and channel number to a Telnet session number and packetizes the binary-data as at least one incoming-data packet. When the incoming-binary data are invalid, the protocol converter 13 sends a message to the wire-line carrier interface requesting retransmission of PCM data associated with the invalid incoming-binary data. The LAN TCP/IP stack 12 transfers the incoming-data packet over the internet protocol (IP) layer as an IP packet where ARP inserts a physical address field of the remote host 17. The LAN-MAC and physical interface 11 converts the incoming-data packet to LAN data and sends the LAN data to the remote host 17.

Figure 2A:
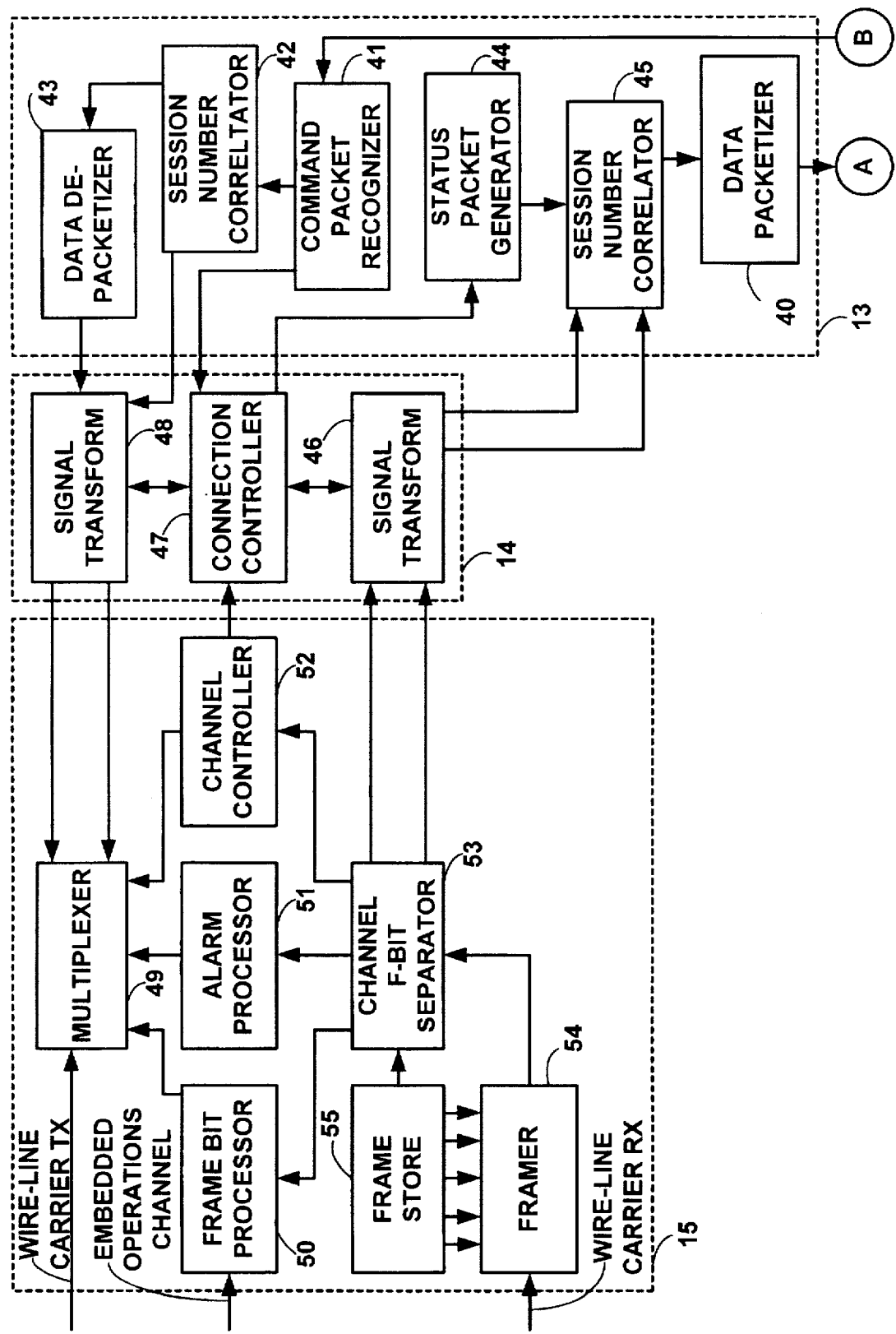
FIG. 2A and FIG. 2B are block diagram of the architecture of the wire-line carrier to local area network interface.
Figure 2B:
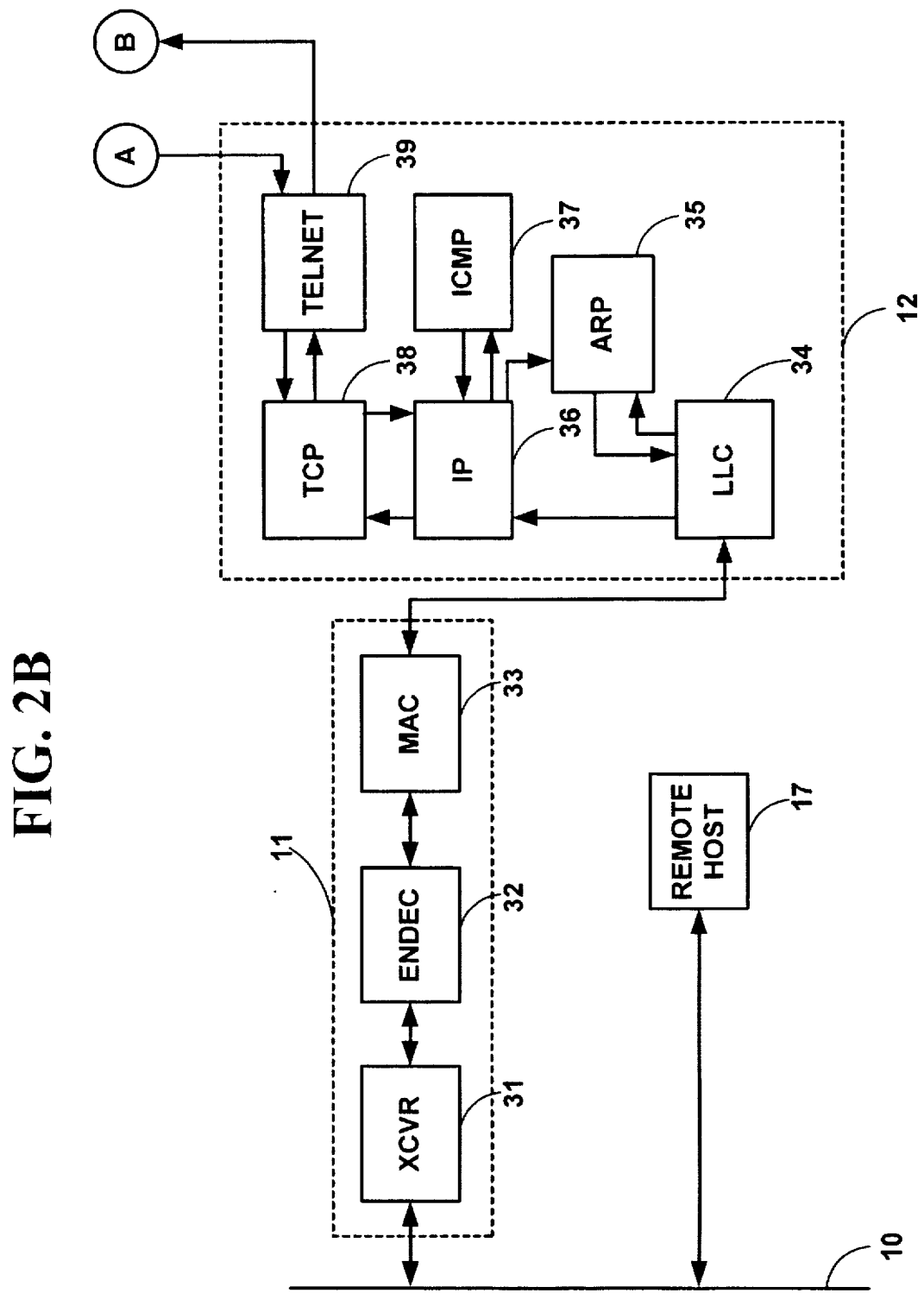

The architectural block diagram shown in FIG. 2A and FIG. 2B illustrates the functionality of each component of the wire-line carrier to LAN module. The LAN-MAC and physical interface 11 includes transceiver 31, encoder/decoder 32, and media access control (MAC) 33. The encoder/decoder 32 is coupled between the transceiver 31 and the MAC 33. The transceiver 31 is coupled to the local area network 10. Also shown is a remote host 17 coupled to the local area network 10.

The LAN TCP/IP stack 12 includes link layer control (LLC) 34, address resolution protocol (ARP) 35, internet protocol (IP) 36, internet control message protocol (ICMP) 37, transmission control protocol (TCP) 38, and telnet 39. The address resolution protocol 35 is coupled between the internet protocol 36 and the link layer control 34. The internet control message protocol 37 is coupled to the internet protocol 36. The transmission control protocol 38 is coupled between the internet protocol 36 and the telnet 39. Also, the link layer control 34 is coupled to the media access control 33.

The protocol converter 13 includes command packet recognizer 41, session correlator 42, data depacketizer 43, status packet generator 44, session number correlator 45, and data packetizer 40. The session correlator 42 is coupled between the data depacketizer 43 and the command packet recognizer 41. The session number correlator 45 is coupled between the status packet generator 44 and the data packetizer 40. The data packetizer 40 and the command packet recognizer 41 are coupled to the telnet 49 of the TCP/IP stack 12.

The connection controller and signal transform subsystem 14 includes first signal transform 46, connection controller 47 and second signal transform 48. The connection controller 47 is coupled between first signal transform 46 and second signal transform 48. The first signal transform 46 is coupled to the session number correlator 45 of the TCP/IP stack 13. The connection controller 47 is coupled to the status packet generator 44 and the command packet recognizer 41 of the TCP/IP stack 13. The second signal transform 48 is coupled to the data depacketizer 43 and the session correlator 42.

The wire-line carrier interface 15 includes multiplexer 49, frame bit processor 50, alarm processor 51, channel controller 52, channel/F-bit separator 53, framer 54, and frame store 55. The frame bit processor 50 is coupled between the multiplexer 49 and the channel separator 53. The alarm processor 51 is coupled between the multiplexer 49 and the channel separator 53. The channel controller 52 is coupled between the multiplexer 49 and the channel separator 53. The frame store 55 is coupled to the framer 54 and the channel separator 53. The multiplexer 49 is coupled to the second signal transform 48. The channel controller 52 is coupled to the connection controller 47. The channel separator 53 is coupled to the first signal transform 46. The wire-line carrier system is coupled to the multiplexer 49, the frame bit processor 50, and the frame store 55. More particularly, outgoing data passes from multiplexer 49 to the wire-line carrier system. Incoming data passes from the wire-line carrier system to frame store 55.

Consider data originating on the remote host 17 and propagating via the local area network 10 through the module to the wire-line carrier system 16. The remote host 17 sends data over the physical Ethernet medium of the local area network 10 which is demodulated by the cable transceiver 31, decoded by the Encoder/Decoder (ENDEC) module 32 which converts the Manchester encoded information to binary information and sends it to the Media Access Control (MAC) layer 33. The MAC layer 33 contains an integral controller which now converts the binary information to a machine-readable format and controls its movement to the link layer control (LLC) module 34. The LLC 34 is responsible for identification of the incoming data packet by its protocol type. The wire-line carrier to LAN module recognizes two types of packets at this layer: (i) Internet Protocol (IP) and (ii) Address Resolution Protocol (ARP). The LLC module 34 discards all other types of data, if any, arriving from the MAC layer 33. In the case of information having the packet type IP, then the LLC module 34 sends the incoming packet to the internet protocol module 36. At this layer, there are two possible destinations for the IP packet: (i) internet control message protocol (ICMP) 37 or (ii) transmission control protocol (TCP) 38. In the case of a TCP packet, the internet protocol module 36 sends the packet to the TCP module 38 which may either request that the remote host 17 send another packet if the data or headers were mangled, or send the packet to Telnet 39 for correlation to its bi-directional session. Telnet 39 then sends the packet to a command packet recognition module 41 which may find that the packet comprises a modem control command, which is decoded and sent to the wire-line carrier connection controller 47. In the case that the command recognition module 41 finds that the packet arriving is not a modem command, then it is presumed to be treated as "data", which is correlated to its wire-line carrier channel number 41 by reference to its session number and de-packetized 43 into binary data and sent to the wire-line carrier call controller and second signal transform 48. The data depacketizer's queues 42 are polled round-robin by the second signal transform 48. Data are dequeued one character at a time. The channel number is received from the session number correlation module 42. The character is encoded with the appropriate error detection and correction bits. The characters are collected and data compression techniques are applied. Error detection/correction and data compression methods are negotiated at call connection time. The data are then transformed directly from binary to a digitized representation of an analog signal, based on the modulation scheme employed, in the form of PCM octets. Several octets make up one signal. The octets are sent to the multiplexer 49 along with the channel on which they are to be transmitted. Octet data samples from each active channel are sent from second signal transform 48 every 125 microseconds to the multiplexer 49 where frame bits, wire-line carrier alarm conditions and signaling bits, e.g. on/off hook, are combined to build a wire-line carrier signal, e.g., a DS1 signal. The wire-line carrier signal is delivered to the wire-line carrier transmit side.

The following is a description of the process of call origination and termination. Information pertaining to on/off hook and active/inactive status is obtained by connection controller 47 from channel control 52. Connection controller 47 keeps the local area network 10 updated with line status by sending status information to status packet generator 44. Connection controller 47 executes modem commands received from command packet recognizer 41. When the request to dial is received, connection controller 47 requests a channel from channel controller 52. Status of the connection (E) is sent to status packet generator 44. The status can be conditions such as "Connection established at 2400-bps", or "No channel available", for instance. Once call origination begins, the connection controller 47 notifies second signal transform 48 to generate the appropriate tones to dial the number. First and second signal transforms 46, 48 then negotiate transmission speed and protocol with the remote modem. When a channel goes off-hook, i.e. a call is coming in, channel controller 52 notifies connection controller 47. Connection controller 47 then sends a message to the first and second signal transforms 46, 48 to send an answer tone and begin protocol negotiations. Once the connection is established, status information (E) is sent from connection controller 47 to status packet generator 44. A request to terminate the call is received from command packet recognizer 41 by the connection controller 47 which signals channel controller 52 to go on-hook. If "no wire-line carrier" is detected, i.e. the call has been terminated, the second signal transform 48 notifies connection controller 47. Connection controller 47 then sends status information to status packet generator 43 indicating that the call has been terminated.

As the address resolution protocol 35 constitutes a terminal node in the protocol stack which is disassociated with the data path to the wire-line carrier side of the system, consider the actions associated with the remote host 17 requesting the MAC address for the wire-line carrier to LAN module. The remote host 17 sends an ARP packet to a destination of "broadcast", that is, to all hosts on the physical network. The packet traverses the physical Ethernet medium of the local area network 10, enters the transceiver 31, moves up the protocol stack through the ENDEC 32, the MAC 33, LLC module 34 and is recognized by the LLC module 34 as an ARP packet and sent to the ARP module 35. All Ethernet hosts on the network receive this packet, but only the wire-line carrier to LAN module recognizes it as a request for its own MAC address. The ARP module 35 then reformats the packet to form an ARP response, fills in the address fields with values associated with the wire-line carrier to LAN module MAC address and sends the packet down to the LLC module 34 for transmission to the remote host 17 via the MAC 33, ENDEC 32, transceiver 31 and the physical Ethernet medium of local area network 10. Likewise, the internet control message protocol 37 implementation represents an additional terminal node within the embedded protocol stack, and its associated actions are described. The remote host 17 executes an application, such as "ping(1)", which utilizes the services of ICMP, sending an echo packet from the remote host 17 via the Ethernet physical medium of local area network 17 to the wire-line carrier system 16 to LAN module via the Ethernet transceiver 31, ENDEC 32 and MAC 33. The LLC module 34 recognizes the packet type as that of IP, and sends the packet to the IP module 36. In turn, the IP module 36 recognizes the IP packet subtype as that of ICMP, and sends the packet to the ICMP handler 37, which recognizes the packet as containing an echo command. The ICMP handler 37 formats an echo response packet, which is then sent to IP module 36, addressed to its destination by ARP module 35, sent to the LLC module 34 which directs the packet to the Ethernet interface via MAC 33, the ENDEC 32 and the transceiver 31, which transmits the packet onto the physical medium of local area network 10 to be received by the remote host 17.

Consider the actions required to move data from the wire-line carrier call controller and signal transform subsystem to the Ethernet LAN medium. The wire-line carrier line is normally connected by two twisted metallic wire pairs that come from the telephone switching facility, which, for example, carry the DS1 signal. The DS1 signal is received, conditioned and shifted into a frame store where the signal can 'lock' on to the frame using framer 54. The DS1 signal shifts out of the frame store 55 into the channel/F-bits separator 53 where the frame alignment signal marks the start of a frame. Extracted frame bits are sent to the frame bit processor 50 where the 4K embedded operations channel (ESF framing) can provide T1 network monitoring, error performance, alarm generation and reconfiguration. Alarm signals that are recognized or problems detected in framing are sent to alarm processor 51 where alarms can be asserted to the distant end. Signaling bits are extracted from each channel at frame bit processor 50 which provide on/off hook, active/inactive channels and are sent to channel control. Octet channel data, normally PCM encoded, are separated, and associated with the channel and sent to first signal transform 46 which process individual channels like 'modems'. A PCM octet representing a compressed PAM sample and the corresponding channel number are received by the first signal transform 46 from the channel/F-bit separator 53. Each signal sample is a binary number between 1 and 255. The samples are collected by the first signal transform 46 and transformed directly to binary data using the modulation scheme negotiated during call connection. As the binary data is collected, the data decompression method, if any, is used to process the data. Negotiated error detection and correction, if any, is applied and the valid data is enqueued onto the session number correlation module 45 one character at a time. The queue is selected based on the channel number associated with the data. If the data received were invalid, then the first signal transform 46 notifies connection controller 47 which in turn sends a message to the transmit side of second signal transform 48 to send a retransmission query to the sending modem. Similarly, if a retransmission query instead of an ACK were received, then the first signal transform 46 notifies connection controller 47 which in turn sends a message to the transmit side of second signal transform 48 to resend the data. Binary data and channel number information arriving from the wire-line carrier portion of the module, are correlated to a Telnet session number and packetized in the format known to Telnet. Modem connection status information is translated into a packetizable format, then correlated to a session number by session number correlator 45 and packetizer by data packetization 40. Telnet 39 binds the outgoing data stream to an incoming one, or bi-directional "session" and sends the Telnet packet to transmission control protocol 38 which provides a reliable data transfer mechanism over the Internet Protocol layer 36. The IP packet is sent to the address resolution protocol module 35 which fills in the physical address field of the destination host, sends the packet to the link layer control module 34 which routes the outgoing packet by its type to the appropriate media access control layer 33. The Ethernet MAC layer controller 33 parcels its data out to the Ethernet Encoder/Decoder (ENDEC) module 32 which converts the MAC packet information to Manchester encoded physical layer Ethernet information according to Ethernet transceiver cable specifications. The Manchester encoded information is sent by the ENDEC 32 to the Ethernet transceiver 31 which converts the Manchester encoded information in transceiver cable format to modulated RF format suitable of transmission on the physical medium 10, either 50 ohm coaxial cable (10base2 or 10base5) or telephone type twisted pair cable (10baseT), to the remote host 17.

Channel control maintains the current state of each channel including on or off hook, active or inactive channel. Requests can be made such as dialing, open an unused channel (origination), along with the possibility of configuring individual DS0 channels for use in the case of a fractional T1 service.

The present invention also includes a method used from a remote host on a local area network, to a wire-line carrier system. The method comprises the steps of converting LAN data from the local area network to an outgoing-data packet with a machine readable format; identifying a protocol type of the outgoing data packet from the LAN-MAC and physical interface; requesting, when the outgoing-data packet has mangled data or a mangled header, the remote host to send another outgoing-data packet; and correlating, when the outgoing data packet has an internet protocol and does not have any of mangled data or a mangled header, the outgoing-data packet to a duplex communications session. The method further includes, when the outgoing-data packet has a modem control command, decoding the modem control command, and when the outgoing-data packet does not have a modem control command, correlating the outgoing-data packet to a channel number. The method includes depacketizing, and when the outgoing-data packet does not have a modem control command, the outgoing-data packet into outgoing-binary data. The method further includes polling, using the channel number, the outgoing-binary data; transforming the outgoing-binary data to a digitized representation of an analog signal having PCM; multiplexing, using the channel number, the digitized representation of the analog signal with frame bits, any alarm conditions and signalling bits as an outgoing-wire-line carrier signal; and sending the outgoing-wire-line carrier signal over the wire-line carrier system.

A method can be used from a wire-line carrier system to a remote host on a local area network. In this embodiment, the method comprises the steps of demultiplexing, using frame bits in a wire-line carrier signal from the wire-line carrier system, the wire-line carrier signal as alarm signals, signalling bits and channel PCM data; associating the demultiplexed PCM data with an appropriate channel; transforming the PCM data to incoming-binary data; and correlating, using the channel number associated with the incoming-binary data and when the incoming-binary data are not invalid, the binary data and channel number to a telnet session number; packetizing, using the channel number associated with the incoming-binary data and when the incoming-binary data are not invalid, the binary data as at least one incoming-data packet; sending, when the binary data include a message, to the wire-line carrier interface requesting retransmission of the PCM data associated with the invalid incoming-binary data; transferring the incoming-data packet over the internet protocol (IP) layer as an IP packet; inserting a physical address field of the remote host; and converting the incoming-data packet to LAN data and sending the LAN data to the remote host.

In use, a T1 line as commonly supplied by the local telephone company is attached directly to a bi-direction wire-line to local area network interface. The bi-directional wire-line to local area network interface, which may be embodied as a digital signal processor, performs the function of both a time division multiplexer and a modem as it samples the 193 bit frames of data to create 24 such byte streams. Each frame has twenty-four 8-bit channels and a single frame bit, 193 data bits in all. The digital signal processor first analyzes the input byte streams to detect the presence of a call. Thus, the call on line T1 is analyzed to detect a tone differential which fits within a predetermined bit pattern that is known to represent selected call data.

The digital signal processor also functions to determine which one of the many encoding methods are being used while a call is in process. Thus, the data stream is put through a predefined sequence in order to test for agreement with some encoding method standard. For example, a modem responsive to V. 32 bis standard uses a three bit quadrature encoding process which is readily susceptible to pattern matching thereby to derive a signature for comparison as a recognition response to indicate to the sender modem that the stations are in agreement. For compatibility, the digital signal processor can recognize and match all currently active modem standards from Bell 103, Bell 212a and the CCITT Standards up to and including latter day V DOT standards.

A complete transformation of the transmitted intelligence is able to take place without ever reverting to the original analog form signal, by using (1) the specifications of the T1 signal and (2) the previously mentioned modem encoding techniques.

The mathematical formula is derived from the specifications of the T1 signal, i.e., a selected one of twenty-four signals, and the modem encoding technique or specifications. This would require information from quadrature encoding as well as data regarding the sampling rate of the T1 signal. Also, there would be required a set of transmission routines based upon the modem type and modem technique. That is, the digital signal processor has a separate routing for each decoding technique, e.g., four different algorithms related to T1-FSK, T1-PSK, T1-QUAD1 and T1-QUAD2.

From the derived formula then, a program is written for control of all of the one or more embedded processors which make up the digital signal processor.

The present invention provides an entity having two logical sets of data inputs and outputs comprising the required electrical and logical components necessary to provide a bi-directional transformation of the T-wire-line carrier wire-line transmission standard to a well-known local area network media access control layer protocol, including the means of performing dial-up call origination and termination control, and the implementation of signal transforms which convert between 8-bit PCM data and binary data directly without the use of analog modem techniques. The uniqueness of this concept is from the decoding of 8-bit PCM data which does not involve the intermediate process of converting the PCM data to analog information prior to the analog demodulation process, but rather digitally demodulated in adherence to well-known modem standards.

The bi-directional wire-line to local area network interface replaces one or more terminal servers along with the modem banks employed by users requiring dial-up service. As a result:

(i) The module provides bi-directional support for a wire-line carrier wire-line. These include the modulation and demodulation, multiplex and de-multiplex of wire-line carrier signals in the time domain, and the signaling required for dial-up call origination and termination.

(ii) The module supports a group of functions implementing a known local area network protocol stack from the media access control layers up to and including the session layer. This functionality presents the module as a set of logical network devices to the remote host.

Conceivably the wire-line carrier information may be directly transformed into a suitable representation of TCP/IP Telnet information without the implementation of the protocol stack itself, with the exception of ARP and ICMP. To be adequately compliant with the TCP/IP specifications, an addressing service, ARP, is used to insert the proper MAC destination addresses onto outgoing packets and to inform other hosts of the MAC that corresponds to the T1 to LAN module itself. The ICMP module may be a partial implementation, supporting the "echo" command and "timestamp" commands. The addition of the ICMP module does not represent a functional requirement, but it is nevertheless standard practice to implement such services in systems having embedded TCP/IP protocol stacks; this makes for simplified facilitation of user diagnostics and also helps in the maintenance of such a system. For example, the "ping (1)" command common to most UNIX TCP/IP implementations uses the ICMP "echo" command for the purpose of determining whether a remote host, or a device having a valid IP address on the network, is connected to the network in an operational manner.

(iii) The module supports the signaling standard used by the MAC layer to communicate with the host computer. For example, if building an Ethernet prototype, then an Ethernet or IEEE 802.3 controller and encoder-decoder (ENDEC) in some form interfaces to the Ethernet media access unit (MAU), also referred to as an access unit interface (AUI), and sometimes referred to as Ethernet "transceiver cable". In addition, should access to thin or thick coaxial media (10Base2 or 10Base5) or access to twisted-pair media (10BaseT) be required, then an appropriate transceiver must be present in the circuit between the ENDEC and required media. The purpose of this transceiver is to modulate and demodulate the physical media with information leaving and arriving in MAU format.

(iv) The module provides user programmability, or the ability for the user to modify the module's parameter set to a certain extent. More specifically, the remote host 17 can set the internet packet address internal to the module so that any host on the same network has access to the fractional wire-line carrier dial-up services.

It will be apparent to those skilled in the art that various modifications can be made to the bi-directional wire-line to local area network interface and method of the instant invention without departing from the scope or spirit of the invention, and it is intended that the present invention cover modifications and variations of the bi-directional wire-line to local area network interface and method provided they come within the scope of the appended claims and their equivalents.

GLOSSARY

10base2: A 10 mb/sec baseband local area network physical layer using coaxial transmission media specified to a maximum point-to-point distance between stations of 200 meters. Coaxial cable for 10base2 networks is generally of type RG58/U or equivalent, and is also referred to as "thin-net" or "cheaper-net".

10base5: A 10 mb/sec baseband local area network physical layer using coaxial transmission media specified to a maximum point-to-point distance between stations of 500 meters. Coaxial cable for 10base5 networks is generally of type RG8/U or equivalent, and is also referred to as "thick-net".

10baseT: A 10 mb/sec baseband local area network physical layer using telephone style twisted-pair media.

A-law: Technique used to encode analog levels by which 255 discrete units divides the quantization scale into segments and steps. There are 13 segments based on logarithmic functions which are divided by linear steps.

Active/Inactive signal: E&M signal state used to represent an active or inactive DS0 channel.

Address Resolution Protocol (ARP): The Internet protocol used to dynamically bind a high-level Internet address to a low-level physical hardware address across a single physical network.

ADPCM: Adaptive Differential Pulse Code Modulation. A process to encode analog levels in which the voltage level change between adjacent samples is represented as 4 bits of data.

AMI: Alternate Mark Inversion. A line code that employs a ternary signal to convey binary digits, in which successive binary ones are represented by signal elements that are normally of alternating, positive and negative polarity but equal in amplitude, and in which binary zeros are represented by signal elements that have zero amplitude.

Amplitude Shift Keying (ASK): In the simplest method of Amplitude Modulation (AM), the amplitude is varied from a zero level to represent a binary zero to a fixed peak-to-peak voltage to represent a binary one.

ANSI: American National Standards Institute. A group that defines U.S. standards for the information processing industry.

Answer mode: A modem is said to be in this mode when it is responding to a modem calling it.

Answer tone: The answering modem generates a signal to tell the originator that it is responding. In North America, the tone generated is 2225 Hz. In Europe it is 2100 Hz.

ARQ: Automatic Retransmission Query. Any protocol which uses positive and negative acknowledgments with retransmission techniques to ensure reliable data transfer.

Asynchronous transmission: Characters are transmitted by encoding them into a series of pulses. The transmission of the character is started by a start pulse equal in length to a code pulse. The encoded character (series of pulses) is followed by a stop pulse that may be equal to or longer than the code pulse, depending upon the transmission code used.

B8ZS: binary 8 zero substitution. A code in which eight consecutive "zeros" (i.e. 00000000) are replaces with the sequence 000+−0−+ if the preceding pulse was +, and the sequence 000−+0+− if the preceding pulse was −, where + represents a positive pulse, − represents a negative pulse, and 0 represents no pulse.

Baseband: Characteristic of any network technology like Ethernet that uses a single wire-line carrier frequency and requires all stations attached to the network to participate in every transmission.

Baud: Literally, baud is defined as the number of times per second which a signal can change states on a transmission medium. Commonly, the transmission medium uses only two signal states, for example two voltage levels, making the baud rate equal to the number of bits of information which are transmitted each second.

Bipolar return to zero: A digital signal technique where alternate polarities are used to represent binary 'ones' with the voltage returning to zero after each 'one'.

Bipolar violation: A condition where two successive pulses have the same polarity and are separated by a zero level (e.g. +0+, where + represents a positive pulse, and 0 represents no pulse).

Bandwidth: The measurement of the width of a range of frequencies. The lowest frequency a circuit can transmit is f1 and the highest is f2 then the bandwidth of a circuit is f2−f1.

Bell-103/113: A standard 300 bps modem providing full-duplex transmission using FSK modulation.

Bell-212A: A standard 1200 bps modem providing full-duplex transmission using dibit PSK modulation.

Bis: A standard from CCITT that already has a V.xx predecessor (e.g. V.26, V.26bis).

Blue alarm: A T-Wire-line carrier condition normally generated by a higher order system (transmission rates greater that T1 transmission), informing the lower level systems that problem exists.

bps (bits per second): The number of binary digits transferred each second. Represents the data transmission rate of a device. Higher speed modems represent more than one binary digit per signal change (baud). For example, the Bell 212A uses dibit Phase Shift Keying (PSK) to represent two binary digits per baud, thus achieving 1200 bps using only 600 baud.

Bridge: A network router which connects two or more networks and forwards packets among them.

Broadcast: A data packet delivery system which delivers a copy of a given data packet to all hosts which are attached to a given network.

Wire-line carrier: A repeating signal that can be modulated or encoded to provide information.

CEPT PCM-30: Conference of European Postal & Telecommunications, Pulse Code Modulation. T-Wire-line carrier system used in Europe which time division multiplexes 30 voice or data circuits, onto a single twisted pair cable operating at 2.048 Mbps.

CCITT: Consultive Committee on International Telephony and Telegraphy. An international organization which sets and maintains standards for the interconnection of telephone equipment.

Checksum: A small integer value, such as one comprising a 16-bit quantity, computed from a larger set of binary data by treating the components of this larger data set as 16-bit integer quantities and computing the sum and used in detecting transmission errors on data communication links. A common method for producing a checksum is to perform 16-bit one's complement word addition on a data set.

Collision: The result of multiple transmission overlapping in the physical channel, resulting in garbled data necessitating retransmission.

Collision detect: A signal provided by the physical network layer to the data link layer to indicate that one or more other stations are contending with the local host's transmission.

Companding: Most of the Pulse Code Modulation (PCM) systems in existence today use companding (COMpressing/ expanding) to adjust the size of the quantized intervals in relation to the input signal level so that the intervals are smaller for small signals and larger for large signals. The -law compandor is used in North America and Japan, while the A-law compander is used in Europe.

Connection Controller and Signal Transform: The subsystem of the T-Wire-line carrier to LAN Interface module that is responsible for call origination and termination, as well as signal transformation from a digital representation of an analog signal directly to digital binary information.

Continuous Frequency Shift Keying (CFSK): see Frequency Shift Keying.

CRC: cyclic redundancy check. A method of checking the integrity of received data, where the check uses a polynomial algorithm based on the content of the data.

CSMA/CD: Wire-line carrier Sense Multiple Access with Collision Detection, the generic term for the class of link management used by the Ethernet.

CVSD: Continuous Variable Slope Delta modulation. A technique used to encode analog voice whereby samples that have increased in height in comparison to a previous sample are encoded as a '1', while a sample that has a height less than a previous sample is encoded as a '0'.

DARPA: Defense Advanced Research Projects Agency. The U.S. government agency that funded research and development efforts which led to the creation of the DARPA Internet.

D1 channel bank: First of the digital channel banks. It used a 7 bit PCM algorithm to digitize voice where the 8th bit of each 8-bit channel used for signaling.

D2 channel bank: Second type of channel bank developed in the digital hierarchy which extended the digitized PCM word to 8 bits, introducing bit robbing to pass channel signaling (on/off hook, dialing digits etc.). Bit robbing would utilize bit positions in selected frames.

D3 channel bank: Third type of channel bank developed in the digital hierarchy. Similar to the D2 channel bank but changed the channel order in the frame, and introduced bipolar return to zero signaling.

D4 channel bank: Fourth type of channel bank developed in the digital hierarchy which multiplexes two sets of 24 channels onto two T1 circuits, or it can be used to interleave two T1 data streams onto a link operating at 3.152 Mbps.

Data Communication Equipment (DCE): General term used to describe hardware functioning in a data transmission and reception capacity, e.g. a modem.

Datagram: The basic unit of information passed along a communications network.

Data Terminal Equipment (DTE): General term used to describe hardware functioning in a data display (session) capacity, e.g. computer.

Demultiplex: To separate a common signal or source into many output signals or information.

Differential Phase Shift Keying (DPSK): see Phase Shift Keying.

Dual-Tone MultiFrequency (DTMF): Combining one tone from the Low-Group and one from the High-Group a signal is generated that represents a phone number from 0–9 and the '*' and '#' symbols.

D4 framing: A framing format that evolved in the digital hierarchy which utilized 12 consecutive frames where the frame bits form a particular pattern and E&M signaling bits located in the 6th and 12th frames.

DS0: Digital Signal level 0. A voice or data channel operating at a nominal rate of 64-kbps.

DS1: Digital Signal level 1. A digital signal transmitted at the nominal rate of 1.544 Mbits/second.

DSI: Digital Speech Interpolation. A form of statistical voice multiplexing which takes advantage of idle moments and half-duplex nature of a telephone conversation.

Duplex: Full-duplex indicates transmission can occur in both directions simultaneously. Half-duplex allows transmission to occur in both directions, but only one direction at a time.

E&M status: Ear and Mouth status. Bi-directional signaling which provides a channel with information such as active or inactive line, on or off hook, dialing digits etc.

E1: T-Wire-line carrier system used in Europe which time division multiplexes 30 voice or data circuits, onto a single twisted pair cable operating at 2.048 Mbps.

Echo cancellation: Provides channel separation by subtracting the transmitted signal and echo from the total line signal. This produces the receiving signal and enables full-duplex transmission using only one channel.

Echo suppression: Echo suppressers are signal-activated devices that, unless disabled, insert a high degree of attenuation in the return echo path during the time a signal flows in the opposite path. This is done to eliminate near-end echo and listener echo from a voice transmission. This usually limits data transmission to one direction at a time. To obtain full-duplex transmission on the network, echo suppression must be disabled.

ECL: Error Check Link. Specified framing bits used in the Extended Superframe Format to provide data integrity using a cyclic redundancy check.

EIA: Electronics Industry Association. A standards organization for the electronics industry which specifies the electrical characteristics for interconnections between terminals and computers or between two computers.

Encoding [coding in PCM]: The generation of a code word to represent a quantized value.

EOC: Embedded Operations Channel. A 4-kbps data link used in the Extended Superframe Format to provide network monitoring, error performance, alarm generation and reconfiguration.

ESF: A framing format which utilizes 24 consecutive frames in which the frame bits form an embedded operations channel, error check link and frame alignment signal.

Encapsulation: The technique used by layered protocols in which a lower level protocol accepts a message from a higher level protocol and places it in the data portion of the lower level packet frame.

ENDEC: Encoder/Decoder. In the Ethernet sense, a device which encodes information from a host system into a form transmissible by a physical medium to another such device having an decoder, which decodes the signals from the physical medium into a form which is understood by a host computer.

Ethernet: A popular CSMA/CD local area network technology developed by Xerox corporation during the 1970's.

Fallback rate: During data exchange between two modems, the number of errors increase on occasion to unacceptable levels. Both sides will negotiate to transmit at a slower rate in an attempt to decrease the number of errors.

FAS: Frame Alignment Signal. The distinctive signal inserted in every frame or once in every n frames, always occupying the same relative position within the frame, and used to establish and maintain frame alignment.

FDM: Frequency Division Multiplex. A multiplexing technique which combines more than one signal on a single wire-line carrier, distinguishable in terms of their relationship in the continuous time frequency domain.

Federal Communications Commission (FCC): Agency that establishes and maintains regulations pertaining to communications in the U.S.

Forward-acting Error Correction (FEC): Codes that carry information which enable errors to be detected and corrected. Examples of such codes are convolutional coding (e.g. Trellis Coded Modulation, or TCM), and Hamming code.

Fragment: One or more pieces of an entire data packet, which when assembled comprise a single unit of data.

Frame bit: A digital entity, or bit, used to identify a frame.

Frame: A cyclic set of consecutive time slots in which the relative position of each frame can be identified.

Framing: The process of identifying a frame.

Frequency: Number of periodic oscillations or waves that occur per unit of time.

Frequency Shift Keying (FSK): Frequency Modulation (FM) refers to how frequently a signal repeats itself at a given amplitude. One frequency represents a binary one while another frequency represents a binary zero.

FT1: Fractional T1. A T-Wire-line carrier service based on the T1 line whereby only a portion of the line is utilized.

Full-duplex: see duplex.

Flow control: Control of the rate at which data flows between two points in a communications network.

Guard tones: Tones generated during certain circumstances to fulfill requirements of standards. For instance, when the telephone switching system requires the modem to transmit an 1800 Hz guard tone after it sends an answer tone.

Half-duplex: see duplex.

Handshaking: When the modem examines the wire-line carrier signal of the remote modem in an attempt to negotiate a common data rate and other transmission parameters its period of negotiation is referred to as its handshaking mode. During the handshaking process the modem negotiates based on the settings of its registers and commands previously issued to both transmitting and receiving modems.

Hardware address: The lower level address used by physical networks; in the case of Ethernet, the hardware address comprises 48-bits of information.

HDB3: High Density Bipolar 3-zero maximum. A coding technique used in Europe to obtain a minimum number of one's density in the basic E1 signal by substituting a 000+.

Hertz (Hz): Describes frequency (i.e. 1 Hz=1 cycle/sec)

in-band: All frequencies in the passband of the telephone company allowed to convey signaling information.

Internet: Physically, a collection of packet switching networks interconnected by gateways along with protocols which allow them to function as a single, large virtual network. When written in upper case, the DARPA Internet is implied, which is such a network.

Internet address: A 32-bit address assigned to hosts that participate in communication linking on the Internet.

Internet Control Message Protocol (ICMP): A control message protocol which handles error and control messages on the Internet.

Internet Protocol (IP): The Internet standard protocol specification which defines the Internet datagram as the unit of information passed along the Internet on a best-efforts basis.

Klotzbach Module: an entity having two logical sets of data inputs and outputs comprising the required electrical and logical components necessary to provide a bi-directional transformation of the T-wire-line carrier wire-line transmission standard to a well-known local area network media access control layer protocol, including the means of performing dial-up call origination and termination control, and the implementation of signal transforms which convert between 8-bit PCM data and binary data directly without the use of analog modem techniques. The uniqueness of this idea is expressed by the fact that the decode of 8-bit PCM data does not involve the intermediate process of converting the PCM data to analog prior to analog demodulation process, but rather digitally demodulated in adherence to well-known modem standards.

LAN: Local Area Network. Any physical network technology which operates at relatively high data transmission rates over short physical distances, usually up to a few thousand meters.

Link Layer Control (LLC): A media-independent communications link control facility on top of the physical channel provided by a network's physical layer.

LPC: Linear Predictive Coding. A technique used to encode voice using four parametric detectors, a pitch detector, voice/unvoices detector, power detector and spectral data decoder.

LSB: Least Significant Bit. Smallest digital entity having a value of '0' or '1' occupying a bit position in a multi-bit quantity of least significance (e.g. bit 1 of an octet).

Manchester encoding: A means by which separate data and clock signals can be combined into a single, self-synchronizable data stream, suitable for transmission on a serial channel.

Mark: A change in signal representing a binary '1'.

Media Access Control (MAC):

Modem: Modulator/demodulator. An electronic device used to convert the digital signals generated by computers and terminal devices into analog tones for transmission over telephone network analog facilities, and vice-versa.

Modulation: The process that alters the characteristics of a wire-line carrier signal. For analog signals, this impresses information upon the signal by altering the amplitude (ASK), frequency (FSK), phase (PSK), or a combination of these (e.g. QAM).

MTU: Maximum Transmission Unit or Maximum Transfer Unit.

The largest amount of data that can be transferred across a given physical network.

-law: Technique used to encode analog levels by which 255 discrete units divides the quantization scale into segments and steps. There are 16 segments based on logarithmic functions which are divided by 16 linear steps.

Multiplex: Combining two or more signals or sets of information onto one common wire-line carrier or device.

Octet: A group of eight binary digits or eight signal elements representing binary digits operated upon as an entity.

On/off hook: A signaling condition used to represent the telephone companies on or off hook condition.

Originate mode: A modem is said to be in this mode when it calls another modem.

Out-of-band: All frequencies outside of the passband of the telephone company, e.g. >3400 Hz. For purposes of the T-Wire-line carrier to LAN module, these frequencies are of no concern.

Packet: The unit of data sent across a packet switching network.

Passband: In terms of the telephone system, it is the contiguous portion of the frequency spectrum which ranges from 300 to 3400 Hz. Low-pass and high-pass filters at the telephone company pass only those signals in this bandwidth.

PBX (Private Branch exchange): Switchboard or electronic switching device.

PCM: Pulse Code Modulation. A process in which a signal is sampled, and each sample is quantized independently of other samples and converted by encoding to a digital signal.

Phase Shift Keying (PSK): Process of varying the wire-line carrier signal with respect to the origination of its cycle. One form of single-bit PSK uses a 90° shift from the previous signal to represent a binary zero while a 270° shift from the previous signal represents a binary one. Because of the current signal's dependence on the previous signal, this technique is often referred to as Differential PSK (DPSK).

Ping: The name of a program, Packet InterNet Groper, which is used to provide reachability information among network hosts.

Protocol: A formal description of message formats and taxonomy by which two or more systems exchange such messages.

Quadrature Amplitude Modulation (QAM): By combining amplitude modulation with phase modulation, a fixed number of signal states can be produced. Each state represents a number of bits. For n bits to be represented, n2 states must be possible. For example, if 12 phase angles are combined with 4 amplitudes, 16 states are possible. This allows 4 bits to be encoded per baud, yielding 9600 bps from 2400 baud.

Quantization: A process in which a continuous range of values is divided into a number of adjacent intervals, and any value within a given interval is represented by a single predetermined value within the interval.

Reverse channel: In addition to the normal channel, a narrower channel is used to send signals in the opposite direction. While the smaller width results in a slower transmission rate, it is typically used for ACKs, NAKs, ARQs, and the like so the speed is sufficient. Other uses include: implementing a 'ping-pong' operation on a half-duplex line to enable quicker turnaround times; and sending commands during a terminal session while the screen contents travel along the normal channel.

RFC: Request for Comments. The name of a series of notes containing surveys, metrics, ideas, techniques and observations as well as proposed and accepted Internet protocol standards.

RS232: An EIA standard specifying the electrical characteristics of slow speed interconnections between terminals and computers or between two computers.

Red alarm: A T-Wire-line carrier line condition which is asserted by the receiver to indicate that it has lost frame alignment.

SF: superframe. A framing-format that evolved in the digital hierarchy which utilized 12 consecutive frames where the frame bits form a particular pattern and E&M signaling bits located in the 6th and 12th frames.

Segment: In the TCP sense, the unit of data transfer sent from TCP on one host to another.

Signaling bits: Bi-directional signaling which provides a channel with information such as active or inactive line, on or off hook, dialing digits etc. (also known as E&M status).

Signal Transform: see Connection Controller and Signal Transform.

Signal to Noise Ratio (SNR): Ratio (measured in dB) used to categorize the quality of a circuit with respect to the intensity of a signal and noise on the circuit. A high SNR (or sometimes referred to as S/N) is desirable since it permits a receiver to discriminate a signal from noise on a circuit.

Signal to Quantizing-noise Ratio (SQR): There are an infinite number of steps possible when sampling an analog signal, therefore, quantizing is necessary to convert to a digital signal with finite steps. This means that some of the original signal is lost. The more quantum steps used, the less signal lost, and the higher (better) the SQR. To reduce the number of steps two techniques are commonly used: nonuniform quantizing; and companding prior to quantizing followed by uniform quantizing.

Space: In the context of signal values, it is a change in signal representing a binary '0'.

Synchronous transmission: A group of characters in a continuous bit stream. Each end of the transmission medium normally provides timing to establish the-data transmission rate and enable the devices to identify the appropriate characters as they are being transmitted or received.

T1 line: A full duplex digital transmission facility that is composed of two twisted metallic pairs and regenerators that carry one DS1 signal.

T-Wire-line carrier: A full duplex digital transmission facility that multiplex multiple voice or data channels onto a common medium.

TCP/IP: A loosely used term used to describe a de-facto standard of transmission control along an internet.

TDM: Time Division Multiplex. A multiplex technique in which many signals are combined onto a single wire-line carrier differentiated by their relative positions in the discrete time domain.

Ter: A standard from CCITT that already has V.xx and V.xxbis predecessors, e.g. V.26, V.26bis, and V.26ter. Note: The terms bis and ter are from Latin and are used to represent secondary and ternary standards.

Time-slot: Any cyclic time interval that can be recognized and defined uniquely.

Time to live: In the Internet Protocol sense, a characteristic present in data packets which avoids the endless routing of packets which are unable to find their destination on the Internet.

Tone signaling: Communications through the phone lines representing such things as dial tone, busy signal, and DTMF are carried out using standard tones.

Training: Modems using synchronous communications need to 'sync-up' with the incoming signal. Training syncs the receive side with the transmit side and establishes descrambler synchronization.

Transmission Control Protocol (TCP): An Internet protocol which provides reliable, full-duplex stream level service on the Internet.

Telnet: A TCP protocol providing remote terminal connection service.

Transceiver: In the Ethernet sense, the portion of the physical layer interface which connects directly to the coaxial cable or twisted pair medium providing electrical signaling for transmission of Ethernet data over such physical medium.

Transceiver cable: In the Ethernet sense, a 4-pair, shielded cable used for interfacing the ENDEC to a transceiver.

Trellis Coding Modulation (TCM): Once a QAM constellation reaches a particular density, it becomes very susceptible to phase jitter, which causes signal points to rotate about the origin. In this case, one signal is misinterpreted for another. To overcome this, TCM is employed. TCM is a form of Forward-acting Error Correcting (FEC) using convolutional coding.

V.21: CCITT standard for 300 bps duplex modem in the general switched telephone network. Similar to the Bell 103.

V.22: CCITT standard for the 1200 bps duplex modem on the general switched telephone network and on leased circuits. Similar to the Bell 212.

V.22bis: CCITT standard for the 2400 bps full-duplex over two-wire facilities.

V32: CCITT standard for the family of 4800/9600 bps modems operating at full-duplex over two-wire facilities.

V.32bis: CCITT standard for the 14,400 bps full-duplex over two-wire facilities.

V.42: CCITT standard for error detection and correction for modems.

V.42bis: CCITT standard for data compression for modems.

Voice Frequency channel (VF channel): The conventional voice channel as defined by the CCITT occupies the band of frequencies from 300 Hz to 3400 Hz.

VQL: Variable Quantizing Level. A voice digitization technique where the speech waveform is filtered from 3400 to 3000 Hz, sampling the passband at 6667 times per second where PCM encoded samples are processed in blocks of 40 providing a 32 kbps digital stream.

XNS: Xerox Network Standard. A local area network protocol developed by Xerox Corporation.

Yellow alarm: A T-Wire-line carrier line condition normally asserted by the transmitter when a red alarm is recognized to acknowledge the loss of frame alignment.

ZBTSI: Zero Byte Time Slot Interchange. A technique used on a DS1 signal to ensure that pulse density requirements are met, where zero octets are replaced by an address chain which is decoded by the receiving terminal.

We claim:

1. An interface used between a remote host on a local area network (LAN), and a wire-line carrier system comprising:
   a LAN media access control (LAN-MAC) and physical interface for converting data from said local area network to an outgoing-data packet with a machine readable format;

a LAN transmission control protocol and internet protocol stack, coupled to said LAN-MAC and physical interface, for identifying a protocol type of the outgoing-data packet from the LAN-MAC and physical interface and for correlating the outgoing-data packet to an incoming-data packet;

a protocol converter coupled to said LAN transmission control protocol and internet protocol stack for correlating the outgoing-data packet to a channel number and depacketizing the outgoing-data packet into outgoing-binary data;

a connection controller and signal transform subsystem coupled to said protocol converter, responsive to the channel number for polling the outgoing-binary data and for transforming, without using an analog signal, the outgoing-binary data to a digitized representation of an analog signal having pulse code modulation (PCM); and a wire-line carrier interface, coupled to said connection controller and signal transform subsystem, responsive to the channel number, for multiplexing the digitized representation of the analog signal as an outgoing-wire-line carrier signal and sending the outgoing-wire-line carrier signal over said wire-line carrier system.

2. The interface as set forth in claim 1 wherein said LAN-MAC and physical interface includes a decoder for converting Manchester encoded data from said local area network to the outgoing-data packet.

3. The interface as set forth in claim 1 wherein said LAN transmission control protocol and internet protocol stack includes an address resolution protocol device responsive to the outgoing-data packet having an address resolution protocol for returning the outgoing-data packet to the remote host for inserting on the outgoing-data packet an internet protocol.

4. An interface used between a wire-line carrier system and a remote host on a local area network (LAN), comprising:

a wire-line carrier interface, coupled to said wire-line carrier system, for demultiplexing the incoming-wire-line carrier signal as demultiplexed PCM data and for associating the demultiplexed PCM data with a channel;

a connection controller and signal transform subsystem, coupled to said wire-line carrier interface, for transforming the demultiplexed PCM data to incoming-binary data;

a protocol converter, coupled to said connection controller and signal transform subsystem, responsive to a channel number associated with the incoming-binary data, for correlating the incoming-binary data and channel number to a telnet session number and packetizing the incoming-binary data as an incoming-data packet;

a LAN transmission control and internet-protocol stack, coupled to said protocol converter, for transferring the incoming-data packet over the internet protocol (IP) layer as an IP packet and for inserting a physical address field of said remote host; and a LAN media access control (LAN-MAC) and physical interface, coupled to said LAN transmission control and internet-protocol stack, for converting the IP packet to LAN data and sending the LAN data to said remote host.

5. The interface as set forth in claim 4 wherein said LAN transmission control and internet-protocol stack includes a link layer control module for routing the incoming-data packet by type to an appropriate media access control layer.

6. The interface as set forth in claim 4 wherein said LAN-MAC and physical interface include an encoder for encoding the incoming-data packet with Manchester encoding.

7. An interface used between a remote host on a local area network (LAN), and a wire-line carrier system comprising:

means for converting LAN data from said local area network to an outgoing-data packet with a machine readable format;

means for identifying a protocol type of the outgoing-data packet and correlating the outgoing-data packet to an incoming-data packet;

means for depacketizing the outgoing-data packet into outgoing-binary data;

means for polling the outgoing-binary data and for transforming the outgoing-binary data to a digitized representation of an analog signal having pulse code modulation (PCM); and means for multiplexing the digitized representation of the analog signal as an outgoing-wire-line carrier signal and sending the outgoing-wire-line carrier signal over said wire-line carrier system.

8. The interface as set forth in claim 7 wherein said converting means includes a decoder for converting Manchester encoded data from said local area network to the outgoing-data packet.

9. The interface as set forth in claim 7 wherein said identifying means includes an address resolution protocol device responsive to the data packet having an address resolution protocol for returning the data packet to the remote host for inserting on the data packet an internet protocol.

10. An interface used between a wire-line carrier system and a remote host on a local area network (LAN), comprising:

means, responsive to frame bits in a wire-line carrier signal from the wire-line carrier system for demultiplexing the wire-line carrier signal, and for associating the demultiplexed wire-line carrier signal with a channel number;

means for transforming the demultiplexed wire-line carrier signal to incoming binary data;

means, responsive to the channel number, for correlating the incoming-binary data and channel number to a telnet session number and packetizing the incoming-binary data as an incoming-data packet;

means for transferring the incoming-data packet over the internet protocol (IP) layer as an IP packet and for inserting a physical address field of said remote host; and means for converting the IP packet to LAN data and sending the LAN data to said remote host.

11. The interface as set forth in claim 10 wherein said transferring means includes a link layer control module for routing the incoming-data packet by type to an appropriate media access control layer.

12. The interface as set forth in claim 10 wherein said converting means includes an encoder for encoding the incoming-data packet with Manchester encoding.

13. A method used between a remote host on a local area network (LAN), and a wire-line carrier system comprising the steps of:

converting LAN data from said local area network to an outgoing-data packet with a machine readable format;

identifying a protocol type of the outgoing data packet from the LAN-MAC and physical interface;

correlating the outgoing-data packet to an incoming-data packet and to a channel number;

depacketizing the outgoing-data packet into outgoing-binary data;

polling, using the channel number, the outgoing-binary data;

transforming the outgoing-binary data to a digitized representation of an analog signal having pulse code modulation (PCM);

multiplexing, using the channel number, the digitized representation of the analog signal as an outgoing-wire-line carrier signal; and sending the outgoing-wire-line carrier signal over said wire-line carrier system.

14. The method as set forth in claim 13, wherein the step of converting includes the step of converting Manchester encoded data from said local area network to the outgoing-data packet.

15. The method as set forth in claim 13 wherein the step of identifying includes the step of returning, in response to the data packet having an address resolution protocol, the data packet to the remote host for inserting on the data packet an internet protocol.

16. A method used between a wire-line carrier system and a remote host on a local area network (LAN), comprising the steps of:

demultiplexing, using frame bits in a wire-line carrier signal from the wire-line carrier system, the wire-line carrier signal;

associating the demultiplexed wire-line carrier signal with a channel number;

transforming the demultiplexed wire-line carrier signal to incoming-binary data;

correlating the binary data and the channel number to a telnet session number;

packetizing, using the channel number, the binary data as an incoming-data packet;

transferring the incoming-data packet over an internet protocol (IP) layer as an IP packet;

inserting, in the IP packet, a physical address field of said remote host; and converting the IP packet to LAN data and sending the LAN data to said remote host.

17. The method as set forth in claim 16 wherein the step of transferring includes the step of routing the incoming-data packet by type to an appropriate media access control layer.

18. The method as set forth in claim 16 wherein the step of converting includes the step of encoding the incoming-data packet with Manchester encoding.

* * * * *